(12) United States Patent
Sayed et al.

(10) Patent No.: US 12,402,652 B2
(45) Date of Patent: Sep. 2, 2025

(54) AEROSOL PROVISION DEVICE

(71) Applicant: Nicoventures Trading Limited, London (GB)

(72) Inventors: Ashley John Sayed, London (GB); Mitchel Thorsen, Madison, WI (US); Luke James Warren, London (GB)

(73) Assignee: Nicoventures Trading Limited, London (GB)

( * ) Notice: Subject to any disclaimer, the term of this patent is extended or adjusted under 35 U.S.C. 154(b) by 838 days.

(21) Appl. No.: 17/593,150

(22) PCT Filed: Mar. 9, 2020

(86) PCT No.: PCT/EP2020/056248
§ 371 (c)(1),
(2) Date: Sep. 10, 2021

(87) PCT Pub. No.: WO2020/182756
PCT Pub. Date: Sep. 17, 2020

(65) Prior Publication Data
US 2022/0183354 A1 Jun. 16, 2022

Related U.S. Application Data

(60) Provisional application No. 62/816,326, filed on Mar. 11, 2019.

(51) Int. Cl.
*A24F 40/40* (2020.01)
*A24F 40/60* (2020.01)

(52) U.S. Cl.
CPC .............. *A24F 40/40* (2020.01); *A24F 40/60* (2020.01)

(58) Field of Classification Search
CPC .......... A24F 40/40; A24F 40/60; A24F 40/44; Y02E 60/10; H01M 2220/30
See application file for complete search history.

(56) References Cited

U.S. PATENT DOCUMENTS

| | | |
|---|---|---|
| 2015/0020825 A1 | 1/2015 | Galloway et al. |
| 2015/0090278 A1 | 4/2015 | Schiff et al. |
| 2018/0043115 A1 | 2/2018 | Gould et al. |
| 2019/0021400 A1 | 1/2019 | Fornarelli |

(Continued)

FOREIGN PATENT DOCUMENTS

| | | |
|---|---|---|
| CN | 105473014 A | 4/2016 |
| CN | 105578914 A | 5/2016 |

(Continued)

OTHER PUBLICATIONS

International Preliminary Report on Patentability for Application No. PCT/EP2020/056248, mailed on Sep. 23, 2021, 7 pages.

(Continued)

*Primary Examiner* — Travis S Chambers
(74) *Attorney, Agent, or Firm* — MERCHANT & GOULD P.C.

(57) ABSTRACT

An aerosol provision device comprises a haptic component configured to provide haptic feedback, a battery configured to power the haptic component, and an electrically insulating resilient member in contact with the haptic component and positioned between the battery and the haptic component.

11 Claims, 8 Drawing Sheets

(56) References Cited

U.S. PATENT DOCUMENTS

| | | | | |
|---|---|---|---|---|
| 2019/0090541 | A1* | 3/2019 | Bernauer | H05B 6/06 |
| 2019/0364968 | A1* | 12/2019 | Fu | H01R 13/521 |
| 2023/0157357 | A1* | 5/2023 | Chen | A24F 40/40 |
| | | | | 131/329 |

FOREIGN PATENT DOCUMENTS

| | | | |
|---|---|---|---|
| CN | 107921224 | A | 4/2018 |
| CN | 108366629 | A | 8/2018 |
| CN | 108697168 | A | 10/2018 |
| EA | 028767 | B1 | 12/2017 |
| JP | 2018528788 | A | 10/2018 |
| RU | 2534848 | C2 | 12/2014 |
| RU | 2640176 | C2 | 12/2017 |
| RU | 2678437 | C1 | 1/2019 |
| RU | 2678912 | C1 | 2/2019 |
| WO | WO-2017118553 | A1 | 7/2017 |

OTHER PUBLICATIONS

International Search Report and Written Opinion for International Application No. PCT/EP2020/056248 mailed on Jun. 5, 2020, 12 pages.

"Examination Report No. 1 for Australian Patent Application No. 2020236474, mailed on May 11, 2022", 3 pages.

"Office Action for Russian Application No. 2021126688, mailed on Jun. 7, 2022", 10 pages.

"Office Action received for Chinese Patent Application No. 202080034004.5, mailed on Aug. 25, 2023", 14 pages (7 pages of English Translation and 7 pages of Official Copy).

* cited by examiner

AEROSOL PROVISION DEVICE

PRIORITY CLAIM

The present application is a National Phase entry of PCT Application No. PCT/EP2020/056248, filed Mar. 9, 2020, which claims priority from U.S. Provisional Application No. 62/816,326, filed Mar. 11, 2019, each of which is hereby fully incorporated by reference herein.

TECHNICAL FIELD

The present invention relates to an aerosol provision device.

BACKGROUND

Smoking articles such as cigarettes, cigars and the like burn tobacco during use to create tobacco smoke. Attempts have been made to provide alternatives to these articles that burn tobacco by creating products that release compounds without burning. Examples of such products are heating devices which release compounds by heating, but not burning, the material. The material may be for example tobacco or other non-tobacco products, which may or may not contain nicotine.

SUMMARY

According to an aspect of the present disclosure, there is provided an aerosol provision device, comprising:
  a haptic component configured to provide haptic feedback;
  a battery configured to power the haptic component; and
  an electrically insulating, resilient member positioned between the battery and the haptic component.

Further features and advantages of the invention will become apparent from the following description of preferred embodiments of the invention, given by way of example only, which is made with reference to the accompanying drawings.

BRIEF DESCRIPTION OF THE DRAWINGS

Embodiments of the invention will now be described, by way of example only, with reference to the accompanying drawings, in which.

DETAILED DESCRIPTION OF THE DRAWINGS

Figure 1:
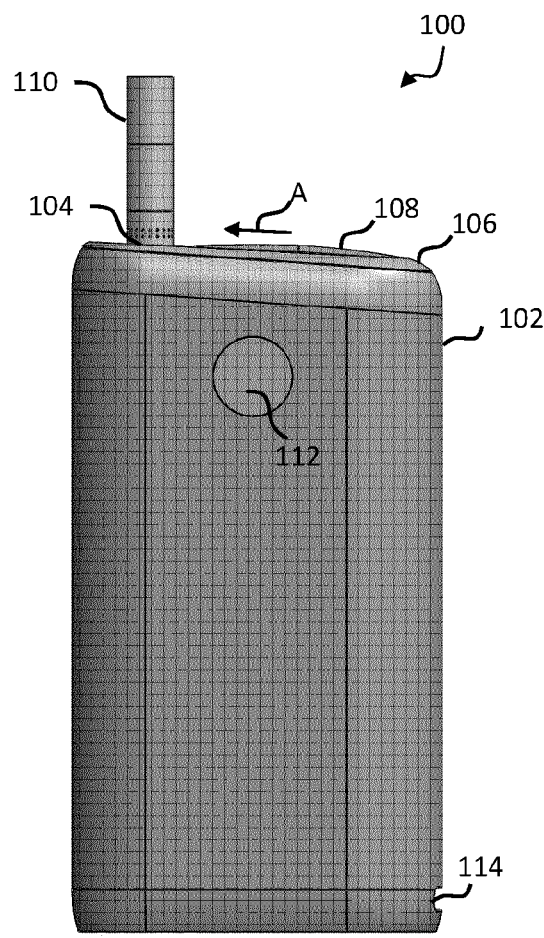
FIG. 1 shows a front view of an example of an aerosol provision device.

As used herein, the term "aerosol generating material" includes materials that provide volatilized components upon heating, typically in the form of an aerosol. Aerosol generating material includes any tobacco-containing material and may, for example, include one or more of tobacco, tobacco derivatives, expanded tobacco, reconstituted tobacco or tobacco substitutes. Aerosol generating material also may include other, non-tobacco, products, which, depending on the product, may or may not contain nicotine. Aerosol generating material may for example be in the form of a solid, a liquid, a gel, a wax or the like. Aerosol generating material may for example also be a combination or a blend of materials. Aerosol generating material may also be known as "smokable material".

Apparatuses are known that heat aerosol generating material to volatilize at least one component of the aerosol generating material, typically to form an aerosol which can be inhaled, without burning or combusting the aerosol generating material. Such apparatus is sometimes described as an "aerosol generating device," an "aerosol provision device," a "heat-not-burn device," a "tobacco heating product device," or a "tobacco heating device" or similar. Similarly, there are also so-called e-cigarette devices, which typically vaporize an aerosol generating material in the form of a liquid, which may or may not contain nicotine. The aerosol generating material may be in the form of or be provided as part of a rod, cartridge or cassette or the like which can be inserted into the apparatus. A heater for heating and volatilizing the aerosol generating material may be provided as a "permanent" part of the apparatus.

An aerosol provision device can receive an article comprising aerosol generating material for heating. An "article" in this context is a component that includes or contains in use the aerosol generating material, which is heated to volatilize the aerosol generating material, and optionally other components in use. A user may insert the article into the aerosol provision device before it is heated to produce an aerosol, which the user subsequently inhales. The article may be, for example, of a predetermined or specific size that is configured to be placed within a heating chamber of the device which is sized to receive the article.

A first aspect of the present disclosure defines an aerosol provision device comprising a haptic component configured to provide haptic feedback, such as a vibration, and a battery configured to power the haptic component. Positioned between the battery and the haptic component is an electrically insulating resilient member. The resilient member electrically insulates the haptic component from the battery to avoid shorting the battery. The resilient member therefore acts as a barrier to stop the battery (or another electrically conductive member connected to the battery) from contacting the haptic component.

In some examples, the resilient member is in contact with the haptic component. In certain examples, the resilient member is also in contact with the battery. By being in contact with the haptic component the resilient member helps transfer vibrations from the haptic component to other components of the device, such as an outer cover which is held by a user. This helps ensure that a user of device is able to feel the vibrations. For example, the resilient member may reduce vibrations which are transmitted to the battery and increase vibrations in directions away from the battery.

By being resilient and in contact with the haptic component, the resilient member can apply a force to the haptic component to transfer vibrations away from the battery. A resilient member can be deformed.

The aerosol provision device may further comprise a heater assembly, which may include at least one inductor coil. The heater assembly may also comprise a susceptor. The battery may also power the heater assembly.

In certain examples the resilient member is a dielectric. The resilient member may have a resistivity of between about $4 \times 10^{15}$ Ohm-cm and about $6 \times 10^{15}$ Ohm-cm, such as about $5 \times 10^{15}$ Ohm-cm.

The resilient member may comprise silicone (i.e. the resilient member may be made from a polymerized siloxane). Silicone is a good electrical insulator, is resilient, and is a good insulator of heat. In a particular example, the silicone is silicone rubber.

The device may further comprise an electrically conductive member in contact with a battery terminal of the battery, and the resilient member may be in contact with the electrically conductive member. The electrically conductive members may be wires or conductive strips which connect the battery to the PCB and/or other components of the device. The terminal may be a positive or negative terminal. Thus, the resilient member electrically insulates the haptic component from the electrically conductive member. In some arrangements the resilient member is in contact with the electrically conductive member and the battery.

The resilient member may be positioned between a battery terminal and the haptic component. The resilient member therefore additionally or alternatively insulates the haptic component from the battery terminal. The battery terminal may be arranged at one end of the battery for example.

The resilient member and the haptic component may each comprise corresponding engagement features for maintaining a relative position between the resilient member and the haptic component. The engagement features therefore help keep the resilient member and haptic component in contact with each other because vibrations can otherwise cause the resilient member and haptic component to move relative to each other.

In a specific arrangement, the resilient member may comprise a protrusion as a type of engagement feature, and the haptic component may comprise a recess as a corresponding engagement feature, which receives the protrusion. Alternatively, the haptic component may comprise a protrusion, and the resilient member comprises a recess, which receives the protrusion. Other types of engagement features may be used instead.

The resilient member may be at least partially compressed, thereby to exert a force on the haptic component away from the battery. For example, the battery and haptic component may be arranged such that the resilient member is squeezed between them, which causes the haptic component to be biased, or subject to a force, away from the resilient member. This causes the haptic component to be forced against other components of the device, which helps transfer vibrations.

For example, the device may comprise an end member which defines at least a portion of an outer surface of the device, wherein the haptic component is arranged between the end member and the resilient member, and the resilient member forces the haptic component towards the end member. One or more other components may be arranged between the haptic component and the end member.

The resilient member may comprise a first portion and a second portion, the first portion being thicker than the second portion, wherein the haptic component is in contact with the first portion, and the second portion is in contact with at least one of: (i) an electrically conductive member in contact with a battery terminal, and (ii) a battery terminal. The thicker first portion acts to provide a biasing force to the haptic component so that the vibrations are transferred away from the battery and towards other components of the device. The thinner second portion can be thinner because it provides electrical insulation. The thickness of the first and second portions are measured in a direction parallel to a longitudinal axis of the device, which is also parallel to a direction away from the battery towards the haptic component.

The second portion may comprise a recess configured to receive an end of the battery. The recess may also be known as a receptacle. The recess may be defined by one or more side walls and a base, where the base receives the end of the battery and the one or more side walls abut a side surface of the battery. Preferably the recess is shaped to conform to the shape of the battery. The recess helps hold the resilient member in position relative to the battery. Instead of a recess, the second portion may comprise an engagement feature, and the battery may comprise a corresponding engagement feature, where the engagement features are for maintaining a relative position between the resilient member and the battery.

The resilient member may be at least 0.5 mm thick between the battery and the haptic component. In a particular arrangement the resilient member is less than about 6 mm thick. The thickness of the resilient member is the smallest measurable distance between the battery and the haptic component. It has been found that these dimensions provide a good balance between providing adequate electrical insulation and a strong biasing force, while also ensuring suitable device dimensions.

In one example, the first portion has a thickness of between about 2 mm and about 3 mm, the second portion has a thickness of between about 0.5 mm and about 2 mm. Preferably the first portion has a thickness of between about 2 mm and about 2.5 mm. The thickness of the second portion is the minimum distance between the first portion and the battery.

If the second portion defines a recess, preferably the first portion has a thickness of between about 2 mm and about 3 mm, the base of the second portion has a thickness of between about 0.5 mm and about 2 mm, and the side walls have a thickness of about 1 to about 3 mm.

If the second portion does not define a recess, the first portion may have a thickness of between about 2 mm and about 3 mm, and the second portion may have a thickness of between about 0.5 mm and about 2 mm, more preferably between about 0.5 mm and about 1 mm.

Preferably, the device is a tobacco heating device, also known as a heat-not-burn device.

FIG. 1 shows an example of an aerosol provision device 100 for generating aerosol from an aerosol generating medium/material. In broad outline, the device 100 may be used to heat a replaceable article 110 comprising the aerosol generating medium, to generate an aerosol or other inhalable medium which is inhaled by a user of the device 100.

The device 100 comprises a housing 102 (in the form of an outer cover) which surrounds and houses various components of the device 100. The device 100 has an opening 104 in one end, through which the article 110 may be inserted for heating by a heating assembly. In use, the article 110 may be fully or partially inserted into the heating assembly where it may be heated by one or more components of the heater assembly.

The device 100 of this example comprises a first end member 106 which comprises a lid 108 which is moveable relative to the first end member 106 to close the opening 104 when no article 110 is in place. In FIG. 1, the lid 108 is shown in an open configuration, however the lid 108 may move into a closed configuration. For example, a user may cause the lid 108 to slide in the direction of arrow "A".

The device 100 may also include a user-operable control element 112, such as a button or switch, which operates the device 100 when pressed. For example, a user may turn on the device 100 by operating the switch 112.

The device 100 may also comprise an electrical component, such as a socket/port 114, which can receive a cable to charge a battery of the device 100. For example, the socket 114 may be a charging port, such as a USB charging port.

Figure 2:
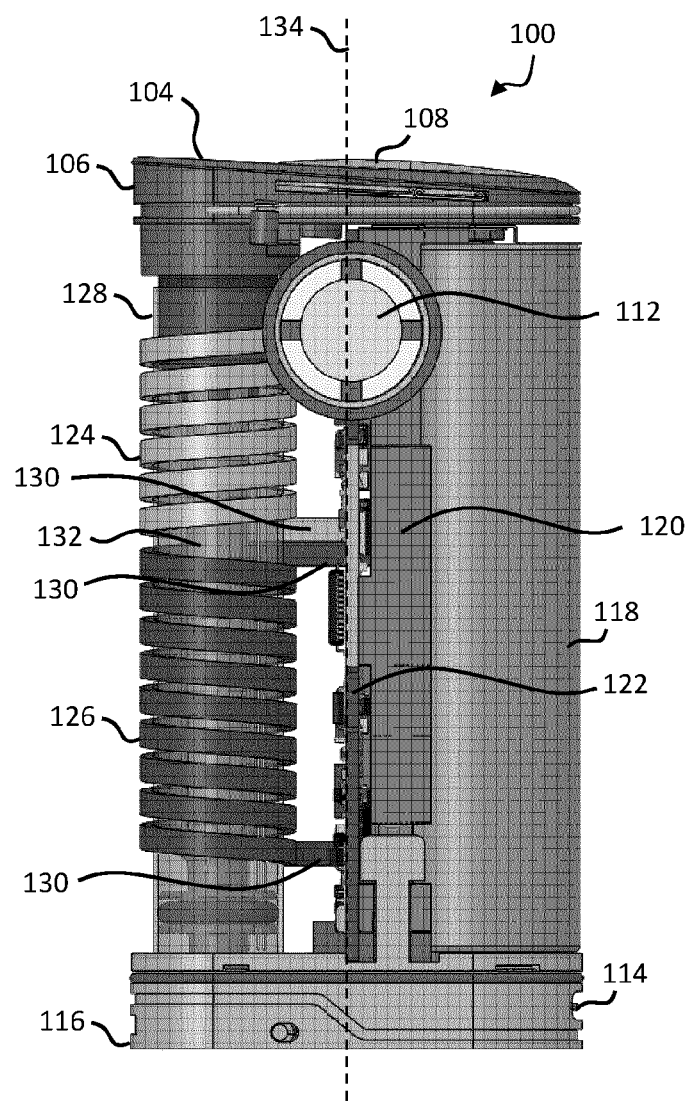
FIG. 2 shows a front view of the aerosol provision device of FIG. 1 with an outer cover removed.

FIG. 2 depicts the device 100 of FIG. 1 with the outer cover 102 removed and without an article 110 present. The device 100 defines a longitudinal axis 134.

As shown in FIG. 2, the first end member 106 is arranged at one end of the device 100 and a second end member 116 is arranged at an opposite end of the device 100. The first and second end members 106, 116 together at least partially define end surfaces of the device 100.

For example, the bottom surface of the second end member 116 at least partially defines a bottom surface of the device 100. Edges of the outer cover 102 may also define a portion of the end surfaces. In this example, the lid 108 also defines a portion of a top surface of the device 100.

The end of the device closest to the opening 104 may be known as the proximal end (or mouth end) of the device 100 because, in use, it is closest to the mouth of the user. In use, a user inserts an article 110 into the opening 104, operates the user control 112 to begin heating the aerosol generating material and draws on the aerosol generated in the device. This causes the aerosol to flow through the device 100 along a flow path towards the proximal end of the device 100.

The other end of the device furthest away from the opening 104 may be known as the distal end of the device 100 because, in use, it is the end furthest away from the mouth of the user. As a user draws on the aerosol generated in the device, the aerosol flows away from the distal end of the device 100.

The device 100 further comprises a power source 118. The power source 118 may be, for example, a battery, such as a rechargeable battery or a non-rechargeable battery. Examples of suitable batteries include, for example, a lithium battery (such as a lithium-ion battery), a nickel battery (such as a nickel-cadmium battery), and an alkaline battery. The battery is electrically coupled to the heating assembly to supply electrical power when required and under control of a controller (not shown) to heat the aerosol generating material. In this example, the battery is connected to a central support 120 which holds the battery 118 in place. The central support 120 may also be known as a battery support, or battery carrier.

The device further comprises at least one electronics module 122. The electronics module 122 may comprise, for example, a printed circuit board (PCB). The PCB 122 may support at least one controller, such as a processor, and memory. The PCB 122 may also comprise one or more electrical tracks to electrically connect together various electronic components of the device 100. For example, the battery terminals may be electrically connected to the PCB 122 so that power can be distributed throughout the device 100. The socket 114 may also be electrically coupled to the battery via the electrical tracks.

In the example device 100, the heating assembly is an inductive heating assembly and comprises various components to heat the aerosol generating material of the article 110 via an inductive heating process. Induction heating is a process of heating an electrically conducting object (such as a susceptor) by electromagnetic induction. An induction heating assembly may comprise an inductive element, for example, one or more inductor coils, and a device for passing a varying electric current, such as an alternating electric current, through the inductive element. The varying electric current in the inductive element produces a varying magnetic field. The varying magnetic field penetrates a susceptor suitably positioned with respect to the inductive element, and generates eddy currents inside the susceptor. The susceptor has electrical resistance to the eddy currents, and hence the flow of the eddy currents against this resistance causes the susceptor to be heated by Joule heating. In cases where the susceptor comprises ferromagnetic material such as iron, nickel or cobalt, heat may also be generated by magnetic hysteresis losses in the susceptor, i.e. by the varying orientation of magnetic dipoles in the magnetic material as a result of their alignment with the varying magnetic field. In inductive heating, as compared to heating by conduction for example, heat is generated inside the susceptor, allowing for rapid heating. Further, there need not be any physical contact between the inductive heater and the susceptor, allowing for enhanced freedom in construction and application.

The induction heating assembly of the example device 100 comprises a susceptor arrangement 132 (herein referred to as "a susceptor"), a first inductor coil 124 and a second inductor coil 126. The first and second inductor coils 124, 126 are made from an electrically conducting material. In this example, the first and second inductor coils 124, 126 are made from Litz wire/cable which is wound in a helical fashion to provide helical inductor coils 124, 126. Litz wire comprises a plurality of individual wires which are individually insulated and are twisted together to form a single wire. Litz wires are designed to reduce the skin effect losses in a conductor. In the example device 100, the first and second inductor coils 124, 126 are made from copper Litz wire which has a rectangular cross section. In other examples the Litz wire can have other shape cross sections, such as circular.

The first inductor coil 124 is configured to generate a first varying magnetic field for heating a first section of the susceptor 132 and the second inductor coil 126 is configured to generate a second varying magnetic field for heating a second section of the susceptor 132. In this example, the first inductor coil 124 is adjacent to the second inductor coil 126 in a direction along the longitudinal axis 134 of the device 100 (that is, the first and second inductor coils 124, 126 to not overlap). The susceptor arrangement 132 may comprise a single susceptor, or two or more separate susceptors. Ends 130 of the first and second inductor coils 124, 126 can be connected to the PCB 122.

It will be appreciated that the first and second inductor coils 124, 126, in some examples, may have at least one characteristic different from each other. For example, the first inductor coil 124 may have at least one characteristic different from the second inductor coil 126. More specifically, in one example, the first inductor coil 124 may have a different value of inductance than the second inductor coil 126. In FIG. 2, the first and second inductor coils 124, 126 are of different lengths such that the first inductor coil 124 is wound over a smaller section of the susceptor 132 than the second inductor coil 126. Thus, the first inductor coil 124 may comprise a different number of turns than the second inductor coil 126 (assuming that the spacing between individual turns is substantially the same). In yet another example, the first inductor coil 124 may be made from a different material to the second inductor coil 126. In some examples, the first and second inductor coils 124, 126 may be substantially identical.

In this example, the first inductor coil 124 and the second inductor coil 126 are wound in opposite directions. This can be useful when the inductor coils are active at different times. For example, initially, the first inductor coil 124 may be operating to heat a first section of the article 110, and at a later time, the second inductor coil 126 may be operating to heat a second section of the article 110. Winding the coils in opposite directions helps reduce the current induced in the inactive coil when used in conjunction with a particular type of control circuit. In FIG. 2, the first inductor coil 124 is a right-hand helix and the second inductor coil 126 is a left-hand helix. However, in another embodiment, the inductor coils 124, 126 may be wound in the same direction, or the first inductor coil 124 may be a left-hand helix and the second inductor coil 126 may be a right-hand helix.

The susceptor 132 of this example is hollow and therefore defines a receptacle within which aerosol generating material is received. For example, the article 110 can be inserted into the susceptor 132. In this example the susceptor 120 is tubular, with a circular cross section.

The device 100 of FIG. 2 further comprises an insulating member 128 which may be generally tubular and at least partially surround the susceptor 132. The insulating member 128 may be constructed from any insulating material, such as plastic for example. In this particular example, the insulating member is constructed from polyether ether ketone (PEEK). The insulating member 128 may help insulate the various components of the device 100 from the heat generated in the susceptor 132.

The insulating member 128 can also fully or partially support the first and second inductor coils 124, 126. For example, as shown in FIG. 2, the first and second inductor coils 124, 126 are positioned around the insulating member 128 and are in contact with a radially outward surface of the insulating member 128. In some examples the insulating member 128 does not abut the first and second inductor coils 124, 126. For example, a small gap may be present between the outer surface of the insulating member 128 and the inner surface of the first and second inductor coils 124, 126.

In a specific example, the susceptor 132, the insulating member 128, and the first and second inductor coils 124, 126 are coaxial around a central longitudinal axis of the susceptor 132.

Figure 3:
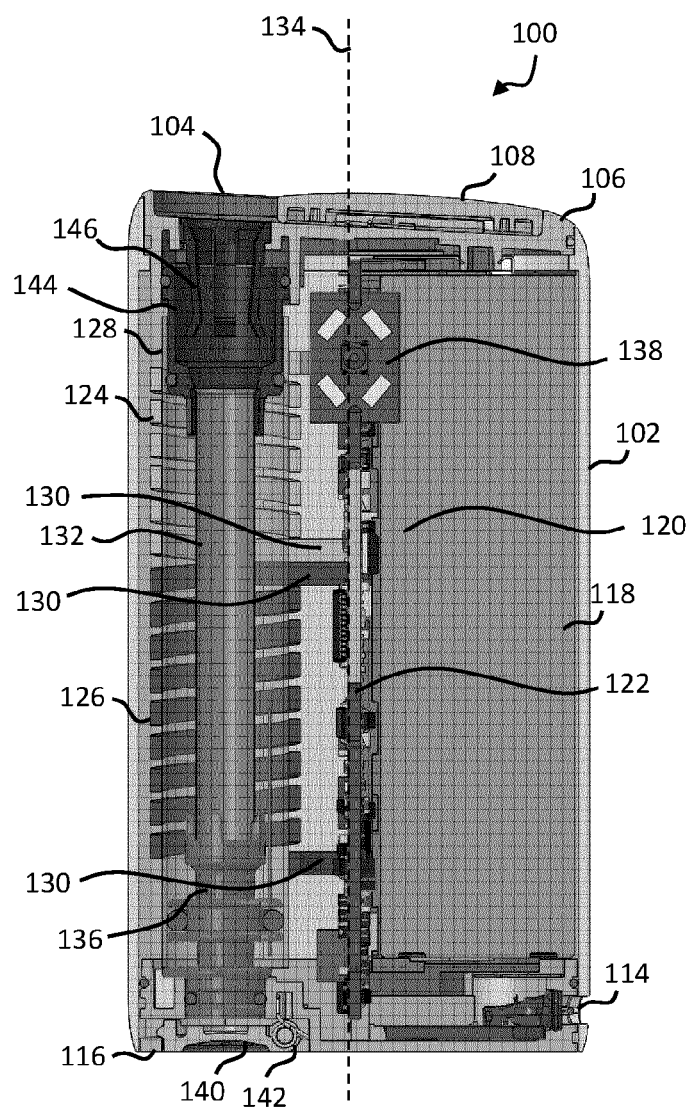
FIG. 3 shows a cross-sectional view of the aerosol provision device of FIG. 1.

FIG. 3 shows a side view of device 100 in partial cross-section. The outer cover 102 is present in this example. The rectangular cross-sectional shape of the first and second inductor coils 124, 126 is more clearly visible.

The device 100 further comprises a support 136 which engages one end of the susceptor 132 to hold the susceptor 132 in place. The support 136 is connected to the second end member 116.

The device may also comprise a second printed circuit board 138 associated within the control element 112.

The device 100 further comprises a second lid/cap 140 and a spring 142, arranged towards the distal end of the device 100. The spring 142 allows the second lid 140 to be opened, to provide access to the susceptor 132. A user may open the second lid 140 to clean the susceptor 132 and/or the support 136.

The device 100 further comprises an expansion chamber 144 which extends away from a proximal end of the susceptor 132 towards the opening 104 of the device. Located at least partially within the expansion chamber 144 is a retention clip 146 to abut and hold the article 110 when received within the device 100. The expansion chamber 144 is connected to the end member 106.

Figure 4:
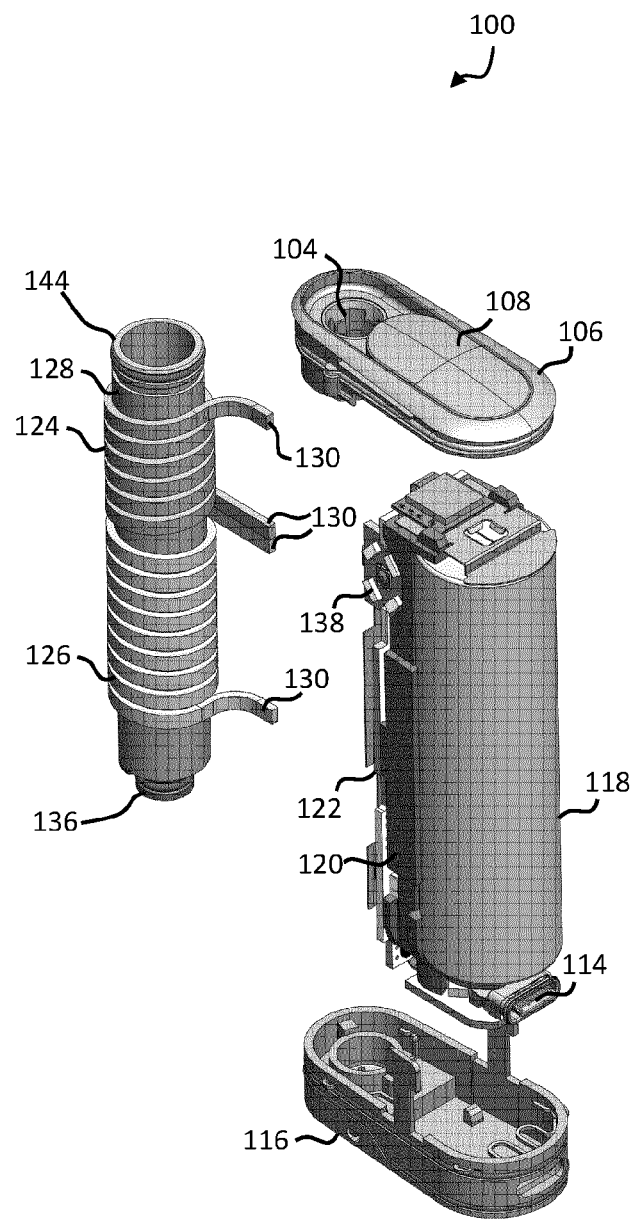
FIG. 4 shows an exploded view of the aerosol provision device of FIG. 2.

FIG. 4 is an exploded view of the device 100 of FIG. 1, with the outer cover 102 omitted.

Figures 5A, 5B:
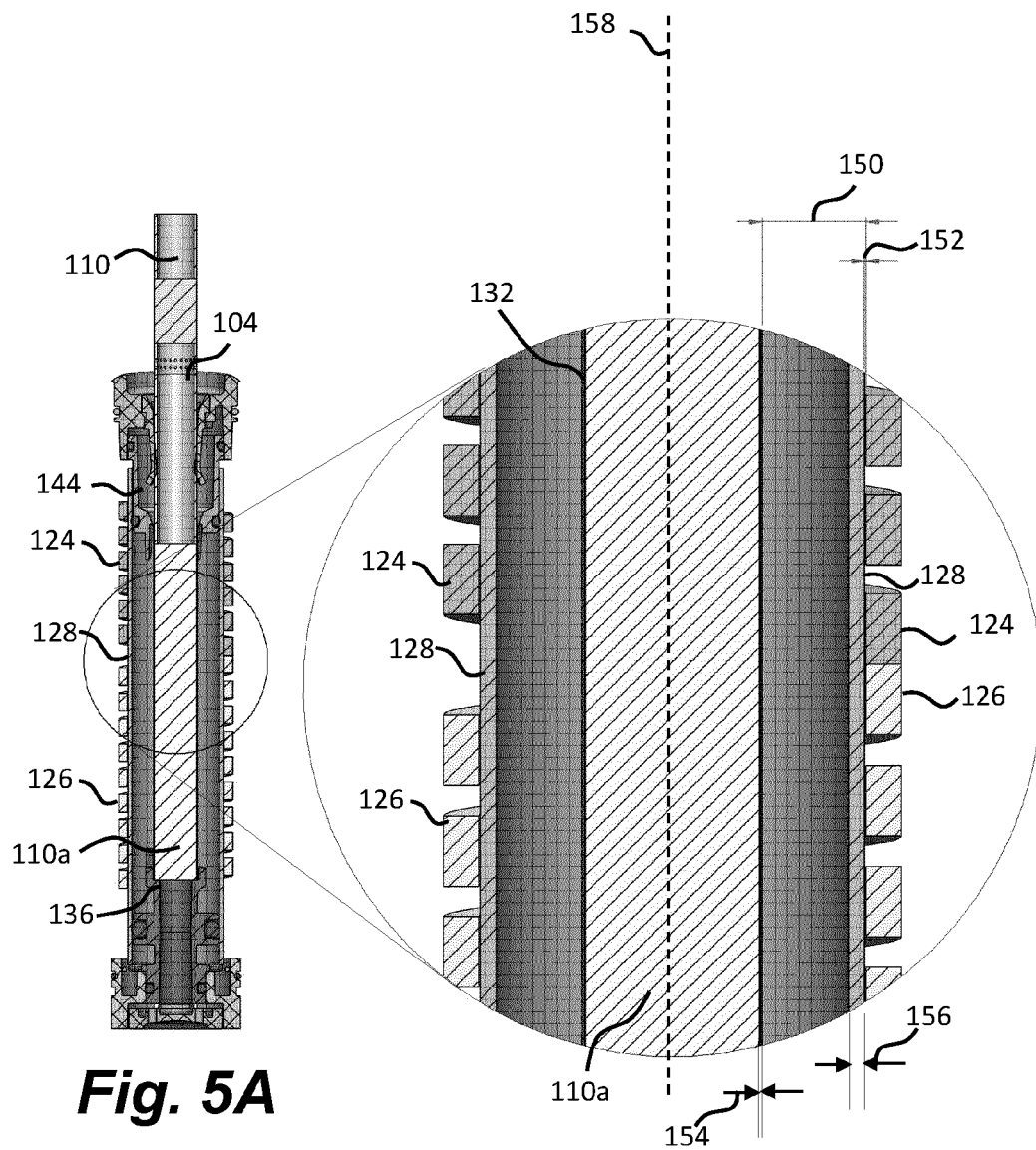
FIG. 5A shows a cross-sectional view of a heating assembly within an aerosol provision device.
FIG. 5B shows a close-up view of a portion of the heating assembly of FIG. 5A.

FIG. 5A depicts a cross section of a portion of the device 100 of FIG. 1. FIG. 5B depicts a close-up of a region of FIG. 5A. FIGS. 5A and 5B show the article 110 received within the susceptor 132, where the article 110 is dimensioned so that the outer surface of the article 110 abuts the inner surface of the susceptor 132. This ensures that the heating is most efficient. The article 110 of this example comprises aerosol generating material 110a. The aerosol generating material 110a is positioned within the susceptor 132. The article 110 may also comprise other components such as a filter, wrapping materials and/or a cooling structure.

FIG. 5B shows that the outer surface of the susceptor 132 is spaced apart from the inner surface of the inductor coils 124, 126 by a distance 150, measured in a direction perpendicular to a longitudinal axis 158 of the susceptor 132. In one particular example, the distance 150 is about 3 mm to 4 mm, about 3 mm to 3.5 mm, or about 3.25 mm.

FIG. 5B further shows that the outer surface of the insulating member 128 is spaced apart from the inner surface of the inductor coils 124, 126 by a distance 152, measured in a direction perpendicular to a longitudinal axis 158 of the susceptor 132. In one particular example, the distance 152 is about 0.05 mm. In another example, the distance 152 is substantially 0 mm, such that the inductor coils 124, 126 abut and touch the insulating member 128.

In one example, the susceptor 132 has a wall thickness 154 of about 0.025 mm to 1 mm, or about 0.05 mm.

In one example, the susceptor 132 has a length of about 40 mm to 60 mm, about 40 mm to 45 mm, or about 44.5 mm.

In one example, the insulating member 128 has a wall thickness 156 of about 0.25 mm to 2 mm, 0.25 mm to 1 mm, or about 0.5 mm.

Figure 6A:
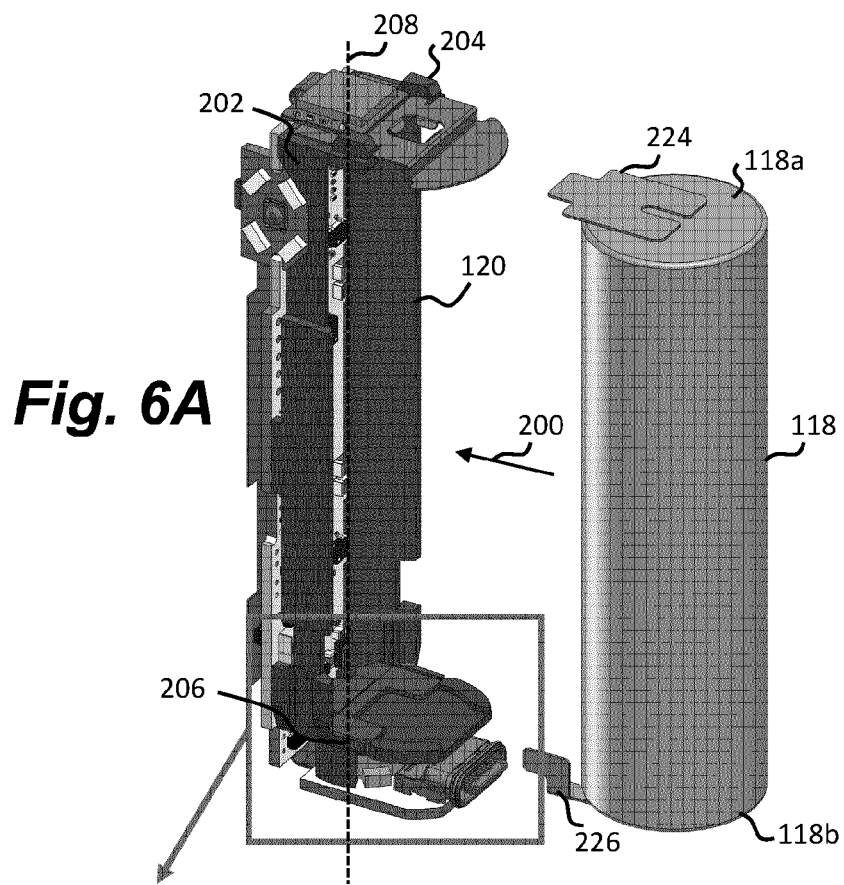
FIG. 6A shows a perspective view of a battery support and battery.

FIG. 6A depicts the battery support 120 of FIGS. 2 and 4 in more detail. The battery support 120 comprises a main portion 202, a first end portion 204 and a second end portion 206. The main portion 202 defines a longitudinal axis 208, which is parallel to the axis 134 of the device 100. The first end portion 204 is arranged at a first end of the main portion 202 and the second end portion 206 is arranged at a second end of the main portion 202. The first and second end portions 204, 206 extend away from a first side of the main portion 202 in a direction substantially perpendicular to the longitudinal axis 208.

In this example the battery 118 is shown disconnected from the battery support 120. The battery 118 can be connected to the battery support 120 by moving the battery 118 towards the battery support 120 in the direction of arrow 200. When connected to the battery support 120, the battery 118 is held between the first and second end portions 204, 206. For example, a top end 118a of the battery 118 is received by the first end portion 204, and a bottom end 118b of the battery 118 is received by the second end portion 206.

FIG. 6A further depicts the PCB 122 engaged with a second side of the main portion 202. The PCB 122 may be adhered to the main portion 202 or may be connected via another means, such as friction fit, snap fit, etc. In this example, the PCB 122 defines a longitudinal axis which is parallel to the longitudinal axis 208 of the main portion 202.

As described above, the aerosol provision device 100 comprises a heater/heating assembly comprising at least one inductor coil 124, 126. FIG. 4 depicts the arrangement of the one or more inductor coils 124, 126 relative to the battery support 120.

As shown in FIG. 6A, the battery 118 comprises a first electrically conductive member 224 in contact with a first battery terminal, and a second electrically conductive member 226 in contact with a second battery terminal. The first and second battery terminals can be positive or negative terminals, for example. The electrically conductive members 224, 226 may be wires or conductive strips which connect the battery 118 to the PCB 122. The electrically conductive members 224, 226 generally extend away from the battery 118 and towards the PCB 122.

Figure 6B:
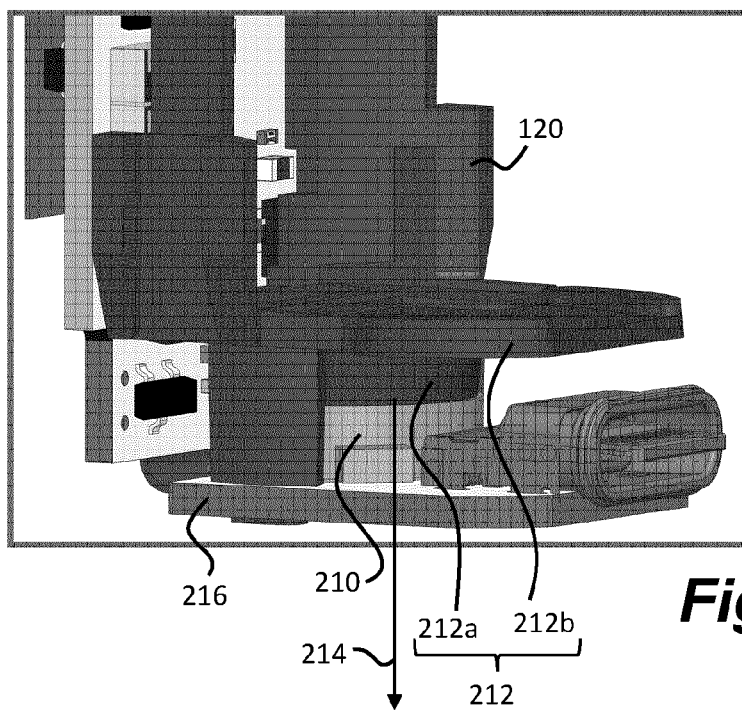
FIG. 6B shows a close-up of a portion of FIG. 6A.

FIG. 6B shows a close up of a portion of FIG. 6A from a different viewing angle. FIG. 6B depicts a haptic component 210, such as a haptic motor, which provides haptic feedback, such as a vibration. The haptic component 210 may provide feedback in response to an event, such as when a user presses the control element 112 and/or when the susceptor 132 has been heated to the correct temperature.

To ensure that the haptic component 210 is electrically insulated from the battery 118 (such as a battery terminal or the electrically conductive member 226), the device 100 comprises an electrically insulating resilient member 212 arranged between the battery 118 and the haptic component 210. The resilient member 212 electrically insulates the haptic component from the battery 118 to avoid shorting the battery 118 by acting as a barrier. Thus, when the battery 118 is connected to the battery support 120, the bottom end 118b of the battery (which may include a terminal) and/or the electrically conductive member 226 is in contact with at least a portion of the resilient member 212.

The resilient member 212 may be arranged in a compressed/deformed state, which causes the resilient member 212 to exert a force on the haptic component 210 in the direction of arrow 214. This biasing force helps transfer vibrations from the haptic component 210 to other components of the device 100, by ensuring the haptic component 210 is pressed firmly against another component, such as a second PCB 216.

In this example, the resilient member 212 is made from silicone rubber, which is a good insulator of heat and electricity.

In the example of FIG. 6B, the resilient member 212 comprises a first portion 212a, and a second portion 212b which extends beyond the first portion 212a and the haptic component 210. The first portion 212a abuts the haptic component 210, and the second portion abuts the battery terminal and/or the electrically conductive member 226. The first portion 212a provides insulation as well as the biasing force. The second portion 212b primarily provides insulation, so can be made thinner the first portion 212a.

Figure 7:
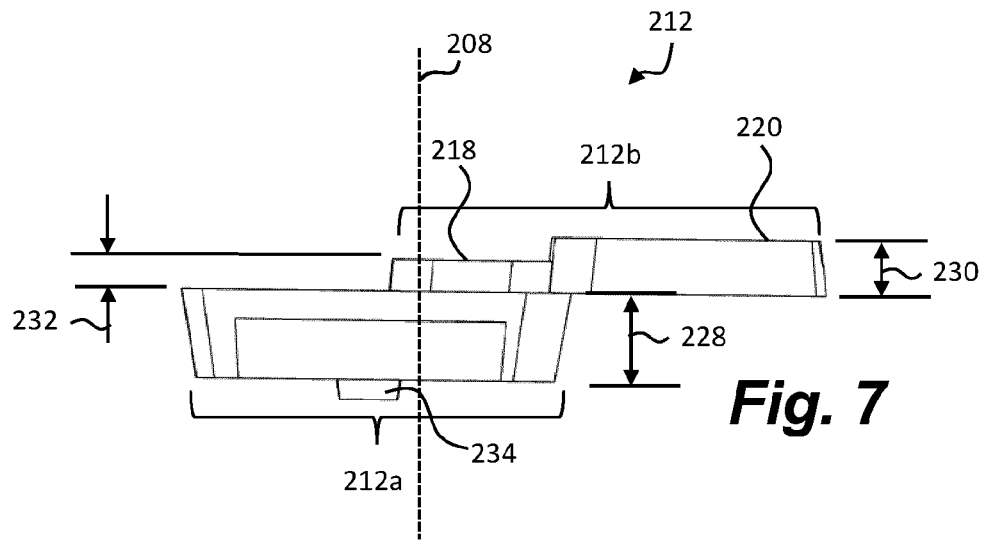
FIG. 7 shows a side view of an example resilient member.
Figure 8:
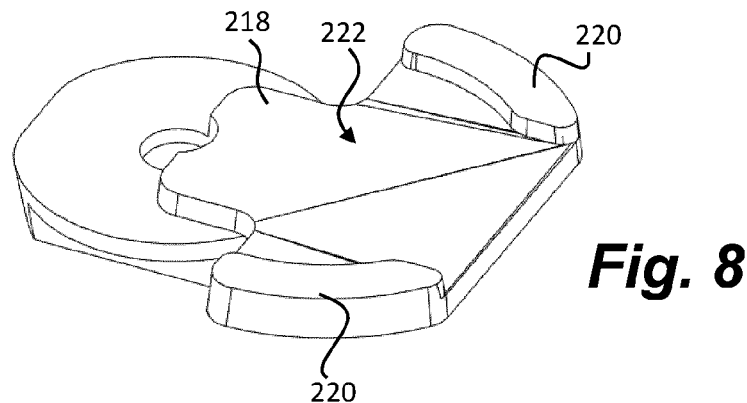
FIG. 8 shows a perspective view of the example resilient member of FIG. 7.
Figure 9:
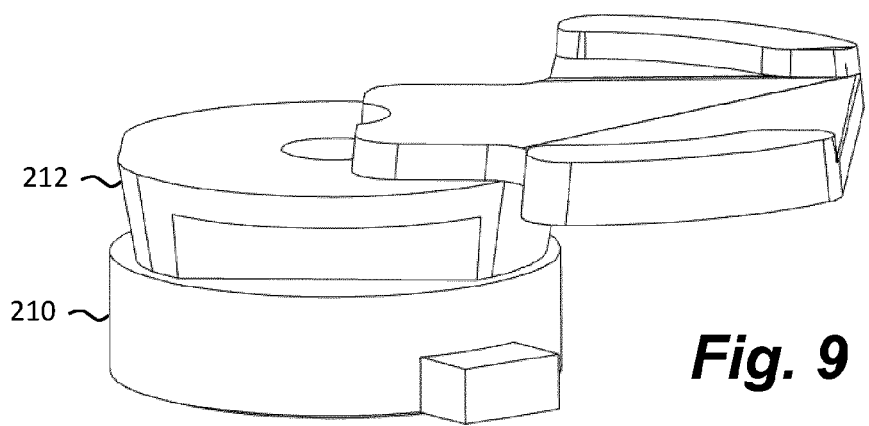
FIG. 9 shows a perspective view of the example resilient member of FIG. 7 engaged with a haptic component.

FIG. 7 depicts a side view of the resilient member 212, and FIG. 8 depicts a perspective view of the resilient member 212. As mentioned, the resilient member 212 comprises a first portion 212a, and a second portion 212b. The first portion 212a is shaped to conform to the haptic component 210, as shown in FIG. 9.

The second portion 212b in this example comprises a base 218 which is at least partially surrounded by one or more side walls 220. The base 218 and the one or more side walls 220 therefore define a recess/receptacle 222 to receive an end 118b of the battery 118. The one or more side walls 220 abut the outer surface of the battery 118 to help hold the resilient member 212 in position relative to the battery 118. The recess/receptacle 222 is shaped to correspond to the shape of the battery 118.

As shown in FIG. 7, the first portion 212a is thicker than the second portion 212b. The first portion 212a has a thickness 228, and the second portion 212b has a thickness 232, defined by the base 218. The side walls 220 have a thickness/height 230. The thickness of the second portion 212b is therefore defined as the minimum distance between the battery 118 and the first portion, so does not include the thickness/height 230 of any side walls. The thickness 232 of the base 218 must be suitable to provide electrical insulation. The thicknesses 228, 230, 232 are each measured in a direction parallel to the longitudinal axis of the device 134, which is also parallel to the axis 208. The thickness is therefore measured in a direction away from the battery 118 towards the haptic component 210 (i.e. in the direction indicated by arrow 214 of FIG. 6B).

In the example of FIG. 7, the first portion 212a has a thickness 228 of between about 2 mm and about 3 mm, such as 2.3 mm, and the second portion 212b has a thickness 232 of between about 0.5 mm and about 2 mm, such as 0.8 mm. The one or more side walls 220 have a thickness/height 230 of between about 1 mm and about 3 mm, such as 1.2 mm. It has been found that these dimensions provide a good balance between providing adequate electrical insulation and a strong biasing force. In certain examples there are no side walls 220 present. The height/thickness 230 of the one or more sidewalls 220 are suitable to maintain the relative position between the battery 118 and the resilient member 212.

In some examples, as shown in FIG. 7, the resilient member 212 comprises an engagement feature 234. The engagement feature 234 engages a corresponding engagement feature of the haptic component 210 to help maintain a relative position between the resilient member 212 and the haptic component 210. In the specific arrangement shown, the resilient member 212 comprises a protrusion 234, and the haptic component 210 comprises a recess (not visible). The protrusion 234 is received in the recess. In another example (not depicted), the haptic component 210 may comprise a protrusion, and the resilient member 212 may comprise a recess.

Figure 10:
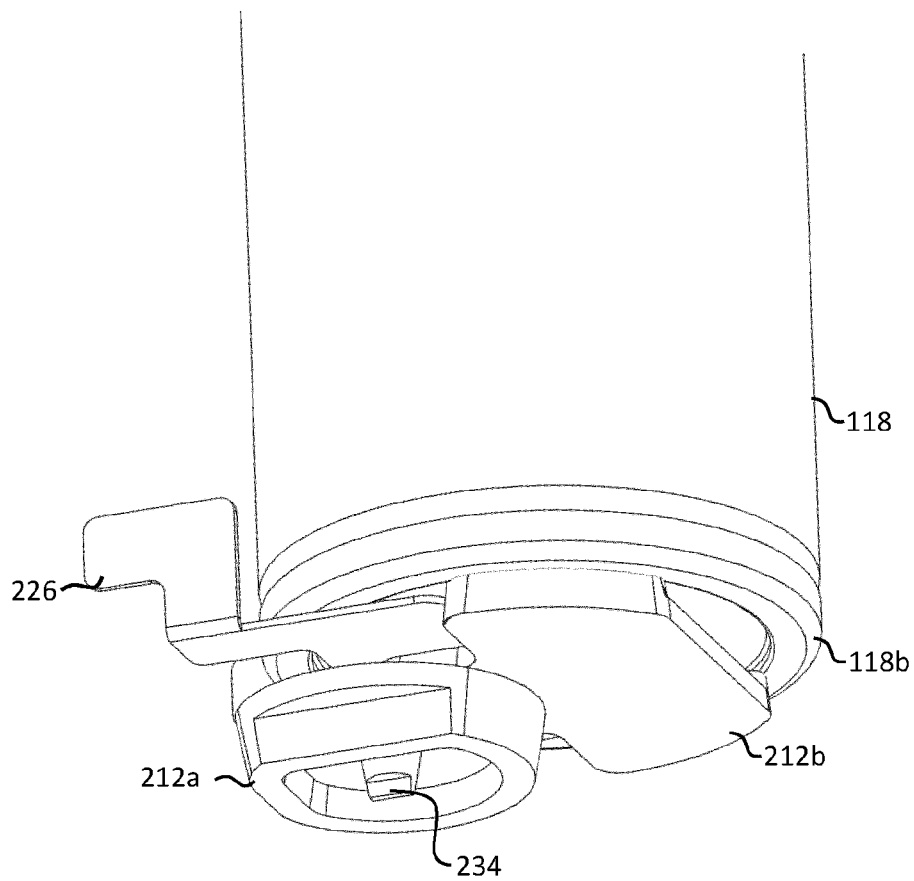
FIG. 10 shows a perspective view of the example resilient member of FIG. 7 engaged with a battery.

FIG. 10 depicts a perspective view of a portion of the battery 118, the electrically conductive member 226, and the resilient member 212. The engagement feature 234 is positioned on an under side of the first portion 212a and extends away from the first portion 212a towards the haptic component 210.

FIG. 10 shows the electrically conductive member 226 positioned between the resilient member 212 and the end of the battery 118b. In this example, the end of the battery 118b comprises the battery terminal, to which the electrically conductive member 226 is connected.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. An aerosol provision device, comprising:
   a haptic component configured to provide haptic feedback;
   a battery configured to power the haptic component;
   an electrically insulating resilient member in contact with the haptic component, wherein the resilient member is at least 0.5 mm thick, and less than 6 mm thick; and
   an outer cover which surrounds and houses the battery, and which is configured to be held by a user,
   wherein the resilient member is at least partially compressed, thereby to exert a biasing force on the haptic component so as to help transfer vibrations from the haptic component to the outer cover.

2. An aerosol provision device according to claim 1, wherein the resilient member comprises silicone.

3. An aerosol provision device according to claim 2, wherein the silicone is silicone rubber.

4. An aerosol provision device according to claim 1, further comprising an electrically conductive member in contact with a battery terminal, wherein the resilient member is in contact with the electrically conductive member.

5. An aerosol provision device according to claim 1, wherein the resilient member is positioned between a battery terminal and the haptic component.

6. An aerosol provision device according to claim 1, wherein the resilient member and the haptic component each comprise corresponding engagement features for maintaining a relative position between the resilient member and the haptic component.

7. An aerosol provision device according to claim 1, wherein the biasing force the haptic component away from the resilient member.

8. An aerosol provision device according to claim 1, wherein the resilient member comprises a first portion and a second portion, the first portion being thicker than the second portion, wherein the haptic component is in contact with the first portion.

9. An aerosol provision device according to claim 8, wherein the second portion comprises a recess configured to receive an end of the battery.

10. An aerosol provision device according to claim 1, wherein the resilient member is less than 3 mm thick.

11. An aerosol provision system, comprising:
    an article comprising aerosol generating material; and
    an aerosol provision device comprising:
       a haptic component configured to provide haptic feedback;
       a battery configured to power the haptic component;
       an electrically insulating resilient member in contact with the haptic component, wherein the resilient member is at least 0.5 mm thick, and less than 6 mm thick; and
       an outer cover which surrounds and houses the battery, and which is configured to be held by a user,
    wherein the resilient member is at least partially compressed, thereby to exert a biasing force on the haptic component so as to help transfer vibrations from the haptic component to the outer cover.

* * * * *